350-274. XR 3566354 SR

Feb. 23, 1971 W. K. FRENCH 3,566,354

CONTOUR PATTERN SCANNER

Filed July 14, 1967 3 Sheets-Sheet 1

*INVENTOR.*
WALTER K. FRENCH

BY John W Armbruster

ATTORNEY

Feb. 23, 1971 W. K. FRENCH 3,566,354

CONTOUR PATTERN SCANNER

Filed July 14, 1967 3 Sheets-Sheet 2

Feb. 23, 1971 W. K. FRENCH 3,566,354

CONTOUR PATTERN SCANNER

Filed July 14, 1967 3 Sheets-Sheet 3

3,566,354

CONTOUR PATTERN SCANNER

Walter K. French, Montrose, N.Y., assignor to International Business Machines Corporation, Armonk, N.Y., a corporation of New York Filed July 14, 1967, Ser. No. 653,564
Int. Cl. G06k 7/10
U.S. Cl. 340—146.3 3 Claims

ABSTRACT OF THE DISCLOSURE

A fingerprint scanner chops images with a notched disk geared to rotate and orbit. The basic electrical chopper output is sinusoidal. Several parallel lines such as print ridges yield a higher frequency superimposed on the regular frequency.

BACKGROUND OF THE INVENTION

Field of the invention

This invention relates in general to fingerprint identification and more particularly to the means for creating a distinctive electrical waveform representative of particular slopes and changes of slopes of fingerprint ridges and valley individual as to angle progressions since they are sensed in an orbital fashion by optical means. It is well established that all fingerprints are different, but it is also to be realized that at times the differences of one print from another are subtle and call for precise definitions as to lines, spaces and counts, etc. In order to code a line pattern, resort is often made to some central reference point to which the other characteristics of the pattern are related in some predetermined manner. It is desirable that a system such as the one of the present invention be employed to find distinctions somewhat independent of any central reference point and rely more assuredly on a whole series of slope determining factors of the pattern which altogehter form a more reliable method of making a determination of an identity.

SUMMARY OF INVENTION

This invention is directed to the identification of contour ridges by the generation of distinctive electronic waveforms representative of ridge slopes and angles at one or more spots over an over-all design, which waveforms are suitable for computer analysis and rapid determination of identity of persons, contours or topological features. The principle of scanning involved is optical reflection beam scanning at constantly, but uniformly, changing angles as created by a chopping disk which is not only notched for regular light modulation and interruption but also mounted as an orbital member in a system of epicyclic gearing suspended over the contour print to be scanned and placed intermediate a lens system and a photoelectric sensing system. The simple scanning apparatus and method involved here comprises use of epicyclic gearing wherein the center sun gear is formed at its center with a circular aperture through which the contour ridge image is projected. Over this aperture there pass the notches of a chopping disk, such notches being of straight-walled sides and equal in width to the opening of the aperture. The chopping disk is uniquely mounted for both rotation and orbital movement by being pivoted on the sun gear whereon the pinion of the chopping disk rotates over a fixed ring gear and orbits around the central aperture as the sun gear is driven by a motor.

When one takes a perfectly circular aperture and periodically chops the light passing therethrough by means of a shutter of the same width as the aperture and having straight shutter sides, the integral of the passed light is sinusoidal at the periodic frequency. Should there by several parallel darkened line of different optical density in the field of view of the aperture such as contour ridge lines or fingerprint ridge lines, and if these lines are parallel to the straight shutter sides, then there will be several cycles of a higher frequency superimposed upon the periodic waveform. An outstanding feature of this invention is the principle of creating higher frequency pulse outputs when the slope of contour ridges coincides with the particular angle of the passing shutter notches.

The scanner comprises a lens array which focuses various portions of the contour pattern source or a source document through the scanning head to the sense source, a scanning head which is the doubly rotating optical chopper, and a sensor array such as a series of photocells related to the lens array. The scanning head comprises a central circular aperture and an optical chopping disk mounted with a planetary pinion associated with a planetary gear system and a motor for driving the system and coordinating the detector or sensing means for taking off an electrical signal proportional to the position of the sun gear upon which the chopper is mounted. The motor turns the planetary gear assembly so that the entire assembly rotates about the central aperture where the pivot of the sun gear normally would be. The chopper periodically chops the image coming through the aperture and this chopping will occur at all angles sequentially as the planetary assembly is rotated. Should there be any parallel ridge lines in the image or even straight black-white discontinuities, then there will be higher frequencies in the interval when the edge of the chopping shutter is parallel to said ridge or contour lines. This effect may be enhanced by placing a high pass filter on the output of the sensor or simply a filter which rejects the basic chopping frequency. The output of the filter will increase every 180° of the planetary assembly rotation when the proper parallel ridge condition exists.

This higher frequency output indication may be used in a variety of ways. One way is to average the output of a plurality of sensors covering the entire contour print or fingerprint thus obtaining a general angular orientation for the fingerprint. Another way is to simply plot the ridge directions and/or their perpendiculars for the purpose of characterizing the print. Still another way is to scan a limited area or areas in the vicinity of a line ending or bifurcation to determine its validity.

An object of this invention is to provide a simple but sophisticated optical analyzer for a data recording such as a character image, contour print, topological map of fingerprint.

It is another object of the present invention to provide a scanning mechanism for optically reading recorded data from all angles with a single scanning member.

It is another object of the present invention to so control a straight line chopper in movement past a circular aperture as to produce a fundamental filterable electrical wave frequency and higher frequencies wherever there are detected straight line discontinuities or parallel ridge lines in the field of view which have the same angle as the straight line chopper.

It is another object of the present invention to provide a negative right angle figure chopper which is capable of detecting a positive figure in the field of view by the presence of higher frequency outputs whenever the figures line up.

A further object of this invention is to provide a system of contour pattern or fingerprint identification which relies on one or more determinations of line slope in such a print, independently of any reference point on a contour print or fingerprint.

Still another object of the invention is to provide a system wherein one or a plurality of optically scanned areas may be selectively determined to be used to derive optical angle and slope information to identify a contour line source or document.

Since it is the pattern itself which the apparatus of the present invention operates upon in a broad range of applications, contour patterns shall be defined herein to mean generally curved patterns of lines on a surface without particular reference to what the lines may happen to be or what the pattern may happen to represent.

Yet another object of the invention is to provide such means capable of identifying which of a known plurality of contour patterns the tested pattern is or is most nearly equal.

The foregoing and other objects, features and advantages of the invention will be apparent from the following more particular description of a preferred embodiment of the invention as illustrated in the accompanying drawings.

DESCRIPTION OF PREFERRED EMBODIMENTS

Figure 1:
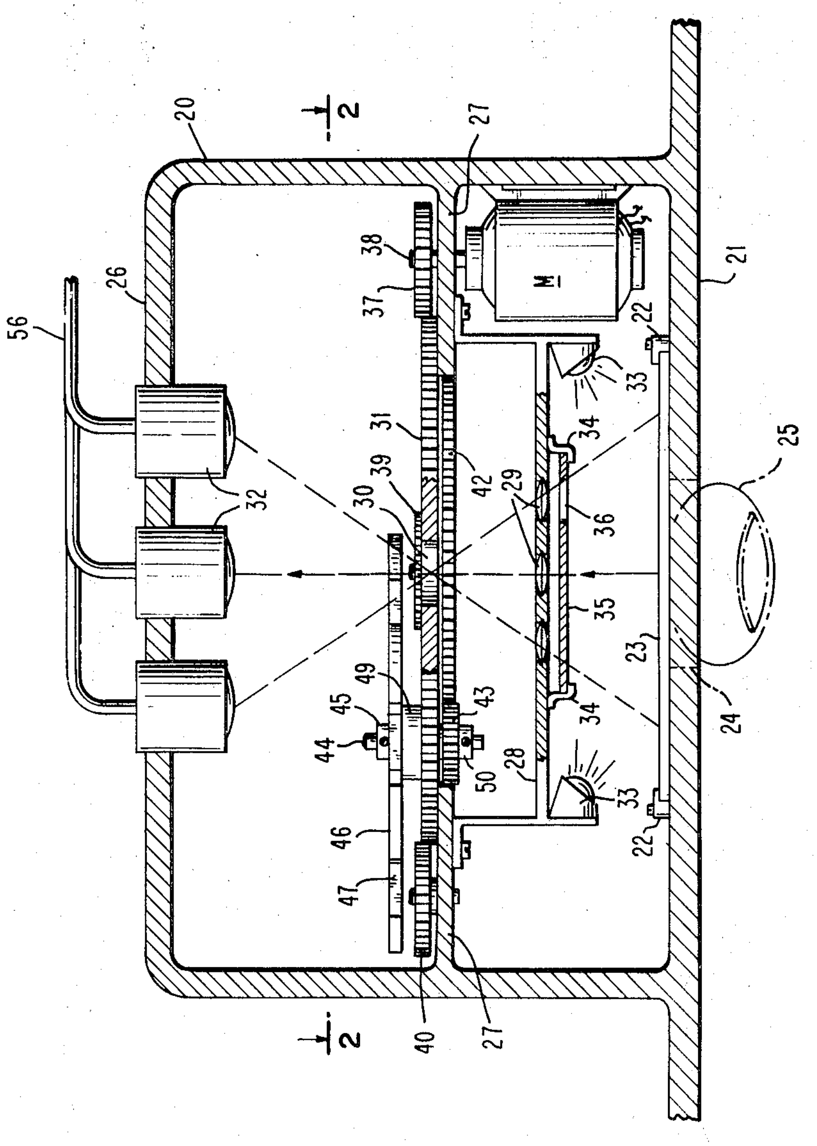
FIG. 1 is a sectional elevation view of the entire scanning mechanism.

The sectional elevation view of FIG. 1 illustrates the principal parts of the apparatus and the manner in which the parts are connected to scan a contour pattern and derive therefrom a waveform distinction for every different contour print.

In FIG. 1 a casing 20 has a base 21 upon which are slide guides 22 for confining an inserted contour pattern map, document or fingerprint record 23. Instead of reading a document 23, a glass plate of a similar shape may be inserted over a base opening 24 and a fingertip 25 placed directly against the glass to be scanned directly instead of via the record 23.

Casing 20 is formed with a top section 26 and a center shelf 27 from which there is suspended a bracket shelf 28 attached to the underside of shelf 27 and containing an array of nine lenses 29 arranged in regular rows and columns of three around the center aligned with the center of the document 23 and the center of a circular aperture 30 formed at the center of rotation or axis of a large sun gear 31, said aperture center also determining the center of alignment of an array of nine photocells 32 arranged in rows and columns of three on the underside of the top section 26.

The arrangement of lenses 29 and photocells 32 is only illustrative for the present embodiment and it is understood that other obvious rearrangements may be made to suit particular scanning problems.

Turning again to observation of the bracket shelf 28, it is seen to be provided with a plurality of illuminating means 33 for directing light against the subject to be scanned at the base. Attached to the bottom of shelf 28 is a pair of slide guides 34 upon which there rests an elongated mask 35 which is formed with various arrangements of openings 36 to selectively expose any one or a combination of the lenses 29 to select a particular spot or spots of the contour pattern to control the photocell output. By sliding the elongated mask 35 either manually or automatically across the lens array 29, it is possible to select a particular lens opening or series of such openings to control the desired range of scanning to be employed for the particular identification problem at hand.

Figure 2:
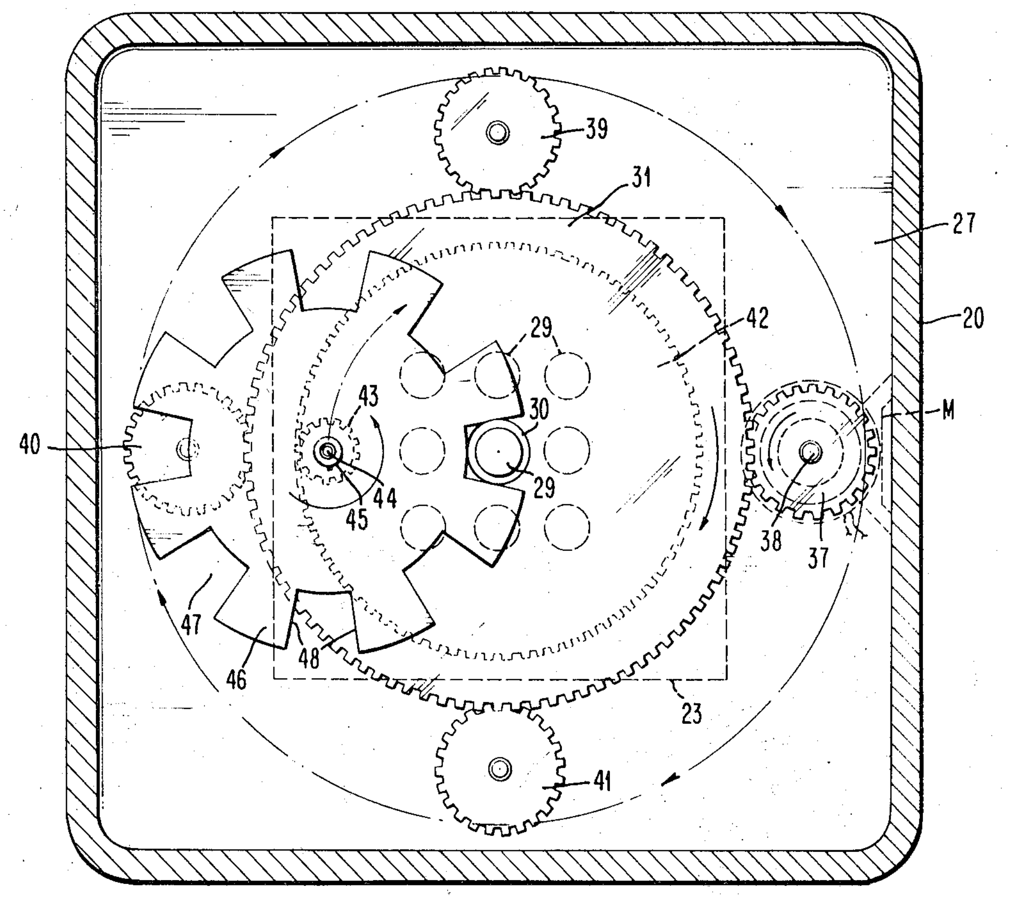
FIG. 2 is a sectional plan view taken along line 2—2 in FIG. 1 and showing the planetary gearing drive for the light chopping disk.
Figure 5:
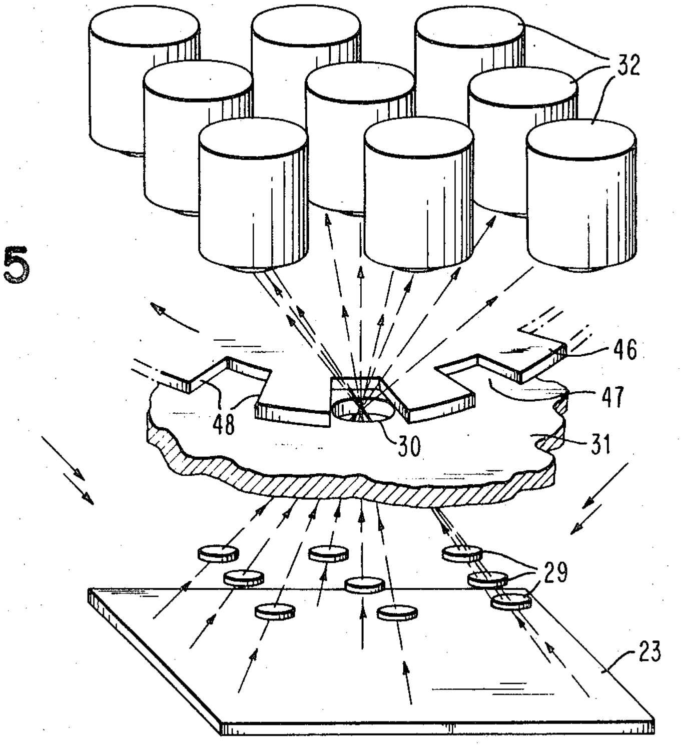
FIG. 5 is a diagrammatic perspective view showing the sensors, the light aperture and chopping mechanism and the lens system superimposed over a source document.

Now reference may be made to both FIGS. 1 and 2 to see how a single epicyclic or planetary geared optical chopper disk 46 is advantageously arranged and employed to generate distinctive high frequency electrical pulse variations representative of changes of angle and slope of contour pattern ridges or lines. A motor M is mounted on the inside of the casing 20 with a shaft 38 thereof projecting vertically through the center shelf 27 and carrying a drive gear 37 mounted near the end of the shaft and operating in a plane directly above the surface of the shelf 27. Drive gear 37 meshes with the teeth on the periphery of a large sun gear 31 resting upon shelf 27. Because of the need for the central opening or aperture 30 to be formed at what is ordinarily the axis shaft position for such a sun gear 31, there is provided a novel method of centralizing and supporting the sun gear 31 in the form of a series of distributed idler gears 39, 40 and 41 spaced equally in quadrature in addition to the drive gear 37, equally around the circumference of the sun gear 31. Each of the idlers 39, 40 and 41 is mounted on vertical shafts projecting upwardly from the center shelf 27 and merely performs the function of holding the sun gear 31 centrally and fully responsive to the drive from the motor M. It is noted from FIG. 2 that the circular aperture 30 is formed in the center of the sun gear 31 and is directly aligned over the central one of the nine lenses 29. The same is true of the alignment with respect to the photocells 32 shown in FIG. 5 where it is seen that the central one of the array of nine cells 32 is aligned directly above the center of the circular aperture 30.

Reference to FIG. 1 shows that a hub 49 is arranged on the top side of sun gear 31 and through it there extends a vertical shaft 44 upon which is mounted the chopping disk 46 by means of a pinned hub 45. On the underside of the sun gear 31, the shaft 44 is seen to be attached to a planetary or obital pinion 43 attached to shaft 44 by pinned hub 50. Therefore chopper disc 46 is rotatably mounted eccentrically or orbitally on sun gear 31. The pinion 43 meshes with a circular fixed ring of gear teeth 42 formed around the inside of a hollow center of the shelf 27.

Referring to FIG. 2, it is seen that when the sun gear 31 is driven in a clockwise direction, the chopper shaft 44 is swung around therewith and the disk 46 not only orbits around with center 44 but it also rotates rapidly counterclockwise in the process because the fixed ring of teeth 42 engage pinion 43 and turn it counterclockwise as its center moves clockwise. As a result the chopper openings or notches 47 sweep rapidly and successively over the aperture 30 at slowly changing angles. The notch opening 47 and intermediate disk teeth are proportioned to be exactly the same width as the aperture opening 30 for creation of a pure sine wave of the basic or fundamental electrical output frequency of the scanner which is then filterable to be cast out so that sole attention may be given to the superimposed high frequency disturbances of parallel contour pattern ridge lines or darkened lines which are the most effective for disturbance when they are found parallel to the sweeping straight side edges 48 of the scanner notches. It is important also that all the sides 48 of all notches 47 be the same straight radial edges or straight edges of some fixed angle because it is in finding parallelism therewith that the contour lines or fingerprint valley lines of darkness cause the greatest degree of high frequency light variation reflected from the print. When such lines are at right angles to the line of attack of the notch slide 48, there is little or no departure or variation from the relatively slow fundamental frequency of the optical modulation and the resulting electrical pure sine waveform.

Again referring to FIG. 2, it is noted that when the scanning disk 46 has swept through one-half of its orbit, i.e., found to be on the opposite side of the arrangement of teeth 42, then the notch sides 48 will have passed through 180° of sweeping operation in passing over the aperture 30. Such a sweep of 180° may be taken as the basic scanning period after which repetition is usually found when scanning a single area.

Figure 6:
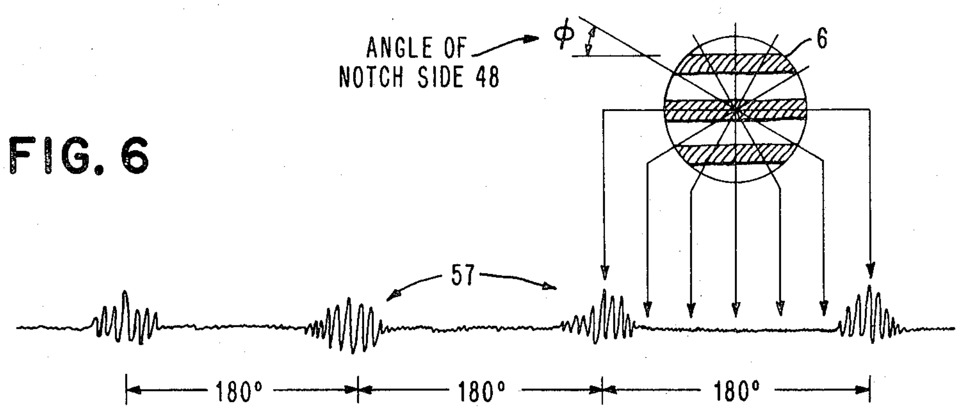
FIG. 6 is a showing of an electrical output wherein the basic low frequency is filtered and there remains the showing of the high frequency signals spaced with relation to a diagram of ridge lines to illustrate the relation of high frequency signals to the detection of the slope of corresponding parallel ridge lines.

In FIG. 1 it is to be realized that the light reflected from the source 33 is directed against the document 23 and directed upwardly through one or more lenses 29 and through the aperture 30 where the lens images the fingerprint ridge structure in the plane of the aperture chopper. The focused image is chopped and integrated before passing to one or more of the photocells 32 out of which it is carried by a cable 56 to filters, pulse shapers, and identifying or recording sections of a computer. In FIG. 6 a showing is given to illustrate how the high frequency disturbances 57 appear once the fundamental frequency is filtered out to focus attention upon the critical aspects of the particular contour pattern. To further illustrate this in FIG. 6 there is shown an area 6 wherein fingerprint ridge lines are shown horizontally, for example, and a whole series of angles are associated therewith which are the angles of attack or angles of the notch side 48 as they appear relative to the sweep of 180° of the scanner disk and the consequent high frequency disturbances 57 found when there is parallelism at the horizontal lines coincident with the ridge lines, as contrasted with the lack of disturbance when there is a perpendicular relationship between the ridge lines and the notch sides.

Figure 4:
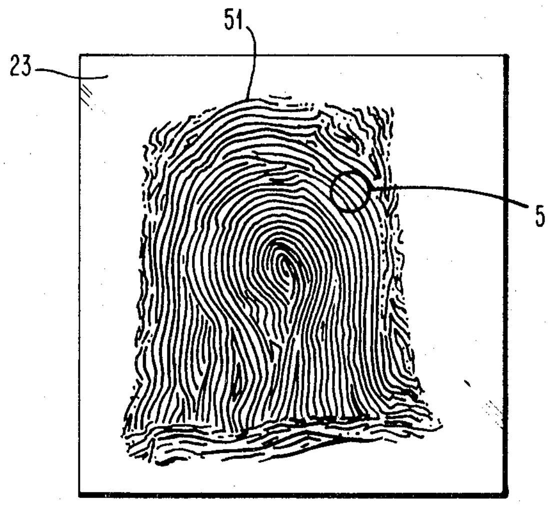
FIG. 4 is a detail view showing a fingerprint on a source document.

In FIG. 4 there is shown a fingerprint record 23 and a characteristic print 51 thereon. Also shown in this view is a small circle 5 which is representative of a select area which may be predetermined to be the characteristic most necessary for the identification of the particular print. Instead of focusing attention on a single area such as 5 of FIG. 4, it is obvious that another way to utilize the device shown is to average the output of a number of sensors 32 covering the entire fingerprint 51, thus obtaining an angular sum orientation for the particular fingerprint. It is also obvious that by the use of the shiftable mask 35, FIG. 1, and the selective reading of the photocells 32, there may be originated a sequence of scanning to determine the relative slope angles of a whole sequence of areas surrounding a contour pattern.

Figure 3:
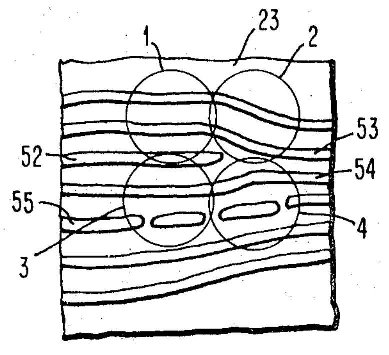
FIG. 3 is a detail view showing a fingerprint line ending to illustrate the analysis of slopes of ridges adjacent to said line ending.

Still another way of utilizing the particular scanning mode is to scan a limited area in the vicinity of a selected characteristic such as a line ending or bifurcation to dedetermine its validity as illustrated in FIG. 3. There it is seen that a print is being scanned in four areas designated by the four rings 1, 2, 3, 4, covering a suspected line ending of a ridge 52. Embracing said ridge 52 are the upper and lower ridges 53 and 54 and a lower broken ridge 55. In the example shown, areas 1 and 3 generate an output showing no difference in slope whereas areas 2 and 4 do show a difference in slope as the adjacent ridges 53 and 54 close in. The same sort of an output would not be found should the same test be made upon the ridge 55 because here there are simply breaks in the ridge and not the necessary changes in slope indicative of a line ending. The reverse of the procedure mentioned with regard to line endings is found in the case of scanning for line bifurcations.

Turning again to FIG. 6 and note taken of the high frequency disturbances 57 found selectively distributed according to the areas sensed and according to the line slopes found in such areas, it is evident that a variety of logical functions in a computer may be performed when once having the slope information at a number of points of a contour pattern such as a fingerprint. From such a complete array of slope information from all areas one may easily compute points of orientation, angles of orientation, locate bifurcations and line endings, count ridges and classify the fingerprint by the basic fingerprint classification system.

While the invention has ben particularly shown and described with reference to preferred embodiments thereof, it will be understood by those skilled in the art that various changes in form and details may be made therein without departing from the spirit and scope of the invention.

What is claimed is:

1. A method of scanning and generating signals indicative of the slope of particular portions of a fingerprint pattern comprising the steps of:
placing a record bearing a fingerprint pattern within a scanning station,
illuminating said fingerprint pattern and directing an image thereof through an aperture,
chopping the image presented to said aperture with a chopping member including a straight sided shutter spaced away from the center of rotation of said chopping member, and
detecting both a basic sinusoidal variation of said reflection and superimposed high frequency variations thereof at intervals determined by coincidence of the slope of said fingerprint lines with the straight sides of said shutter, said chopping step involving the epicyclic rotation and orbiting of said chopping member around said aperture for scanning across said pattern at all angles over a substantial area successively to provide signals indicative of angles of straight lines and locations thereof in a fingerprint pattern.

2. An optical scanning device comprising:
a lens system through which light from a pattern is directed,
a member having an opening therein, said member being movable over a circular aperture with combined rotative and orbital motion so that said opening therein passes at all angles over said aperture, said member comprising a light chopping shutter with a straight edge opening adapted to sweep past said aperture and modulate the light from said pattern passing therethrough, said member being a rotative planetary member in a system of epicyclic gearing surrounding said aperture, said epicyclic gearing including a driven sun gear upon which said member is eccentrically mounted and rotated so that said opening therein sweeps over the aperture which is at the center of said sun gear.
a fixed ring gear being provided adjacent said sun gear and said member having a pinion meshing with said ring gear to rotate it during an orbital sweep thereof over said aperture, said sun gear being supported by a plurality of outer idler gears and driven by another outer gear, whereby the axis center of said sun gear is unnecessary for supporting said sun gear thereby permitting said aperture to be located centrally of said sun gear, and
a sensor for sensing and tranducing said modulated light.

3. An optical scanning device comprising:

a lens system through which light from a pattern is directed, a member having an opening therein, said member being movable over a circular aperture with combined rotative and orbital motion so that said opening therein passes at all angles over said aperture, said member is a light chopping disk with a series of straight sided openings and intervals equal in width and spacing between said openings around said disk to the width of said aperture, comprising notches and teeth adapted to sweep past said aperture and modulate the light from said pattern passing therethrough, said member being a rotative planetary member in a system of epicyclic gearing surrounding said aperture, said epicyclic gearing including a driven sun gear upon which said member is eccentrically mounted and rotated so that said opening therein sweeps over the aperture which is at the center of said sun gear, a fixed ring gear being provided adjacent said sun gear and said member having a pinion meshing with said ring gear to rotate it during an orbital sweep thereof over said aperture, said sun gear being supported by a plurality of outer idler gears and driven by another outer gear, whereby the axis of said sun gear is unnecessary for supporting said sun gear thereby permitting said aperture to be located centrally of said sun gear, a system of sensors for sensing and transducing said modulated light, a masking means for selectively making effective one or more of a plurality of lenses of said lens system arranged about a center in an orthogonal array to scan a particular area or areas of a contour pattern in a desired sequence.

References Cited

UNITED STATES PATENTS

| | | | |
|---|---|---|---|
| 1,788,227 | 1/1931 | Bentley | 178—7.6 |
| 2,109,596 | 3/1938 | Plahn | 350—169 |
| 2,646,717 | 7/1953 | Selgin | 356—71 |
| 2,942,118 | 6/1960 | Gedance | 250—233X |
| 2,952,181 | 9/1960 | Maurer | 356—71 |
| 3,024,699 | 3/1962 | Chitayet | 250—233X |
| 3,072,794 | 1/1963 | Ostergren | 250—233X |
| 3,138,712 | 6/1964 | Aroyan | 350—274X |
| 3,143,654 | 8/1964 | Aroyan et al. | 250—233 |
| 2,243,838 | 6/1941 | Cunningham | 33—76 |
| 3,248,552 | 4/1966 | Bryan | 340—146.3X |
| 3,366,926 | 1/1968 | Silsby III et al. | 340—146.3 |

FOREIGN PATENTS

| | | | |
|---|---|---|---|
| 962,818 | 7/1964 | Great Britain | 356—71 |

MAYNARD R. WILBUR, Primary Examiner

L. H. BOUDREAU, Assistant Examiner

U.S. Cl. X.R.

178—7.6; 250—233; 350—274; 356—71